(12) United States Patent
Utagawa

(10) Patent No.: US 7,706,628 B2
(45) Date of Patent: Apr. 27, 2010

(54) IMAGE PROCESSING APPARATUS FOR IMAGE TONE TRANSFORMATION BASED ON INPUT SIGNALS, IMAGE PROCESSING PROGRAM, ELECTRONIC CAMERA, AND IMAGE PROCESSING METHOD FOR THE SAME

(75) Inventor: Ken Utagawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 776 days.

(21) Appl. No.: 11/225,132

(22) Filed: Sep. 14, 2005

(65) Prior Publication Data

US 2006/0062452 A1   Mar. 23, 2006

(30) Foreign Application Priority Data

Sep. 17, 2004  (JP)  ............................. 2004-272184
Feb. 28, 2005  (JP)  ............................. 2005-053635

(51) Int. Cl.
    *G06K 9/40* (2006.01)
(52) U.S. Cl. ...................................... 382/274
(58) Field of Classification Search ................ 382/254, 382/274, 162, 167; 358/75, 80, 461, 518, 358/519, 520, 521, 523; 348/222.1, 223.1, 348/251, 254, 256, E9.001, E9.037, E9.04, 348/645, 649, 650, 651, 652; 345/20, 63, 345/77, 580, 581, 582, 583, 584, 585, 586, 345/587, 588, 589, 590, 591, 592, 593, 594, 345/595, 596, 597, 598, 59
See application file for complete search history.

(56) References Cited

U.S. PATENT DOCUMENTS 4,623,973 A * 11/1986 Hoffrichter et al. ......... 382/167

| 4,812,903 A | | 3/1989 | Wagensonner et al. |
| 5,296,920 A | | 3/1994 | Sakaue et al. |
| 5,555,031 A | | 9/1996 | Van Rooij |
| 5,619,280 A | | 4/1997 | Yamashita et al. |
| 5,661,575 A | | 8/1997 | Yamashita et al. .......... 358/519 |
| 5,940,144 A | | 8/1999 | Lenz et al. |
| 6,101,271 A | | 8/2000 | Yamashita et al. .......... 382/167 |
| 6,243,133 B1 | * | 6/2001 | Spaulding et al. ......... 348/223.1 |
| 6,677,959 B1 | | 1/2004 | James ......................... 345/660 |
| 6,686,971 B2 | * | 2/2004 | Oh .............................. 348/649 |
| 2003/0174222 A1 | * | 9/2003 | Uchida ........................ 348/241 |
| 2003/0193579 A1 | | 10/2003 | Mori et al. |
| 2004/0120576 A1 | * | 6/2004 | Kim ........................... 382/167 |

FOREIGN PATENT DOCUMENTS

| EP | 0 533 100 A2 | 3/1993 |
| EP | 0 647 069 A1 | 4/1995 |
| EP | 0 677 972 A2 | 10/1995 |
| EP | 0 812 107 A1 | 12/1997 |
| EP | 1 324 621 A1 | 7/2003 |
| JP | A 04-150171 | 5/1992 |

* cited by examiner

*Primary Examiner*—Samir A. Ahmed
*Assistant Examiner*—Atiba O. Fitzpatrick
(74) *Attorney, Agent, or Firm*—Oliff & Berridge, PLC

(57) ABSTRACT

An image processing apparatus of the present invention receives a luminance signal indicating luminance or an amount of brightness and input signals indicating a plurality of color differences, and it includes: a signal generator generating a signal Z depending on the input signals indicating the plural color differences; a gain generator generating a transformation gain k(Z) by using the signal Z; and a tone transformation unit which multiplies the luminance signal by the transformation gain k(Z) to calculate a luminance signal after tone transformation.

9 Claims, 10 Drawing Sheets

IMAGE PROCESSING APPARATUS
11

FIG.3
[A] 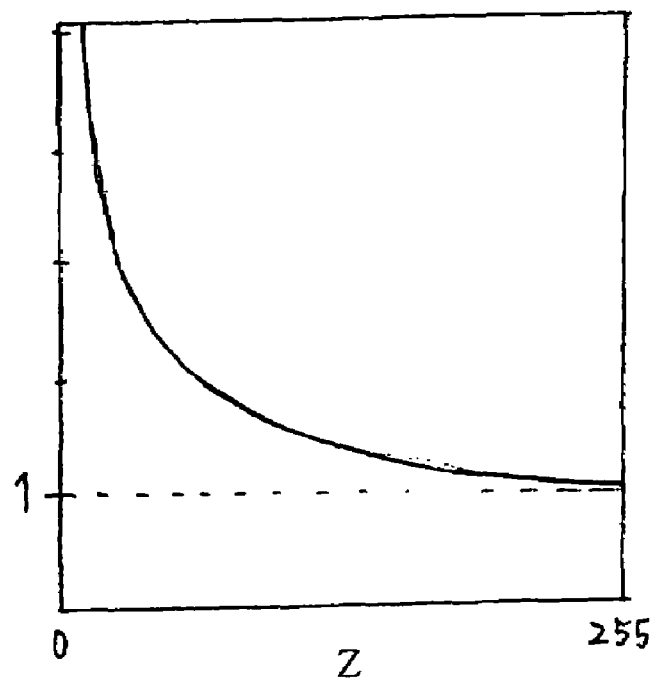
[B] 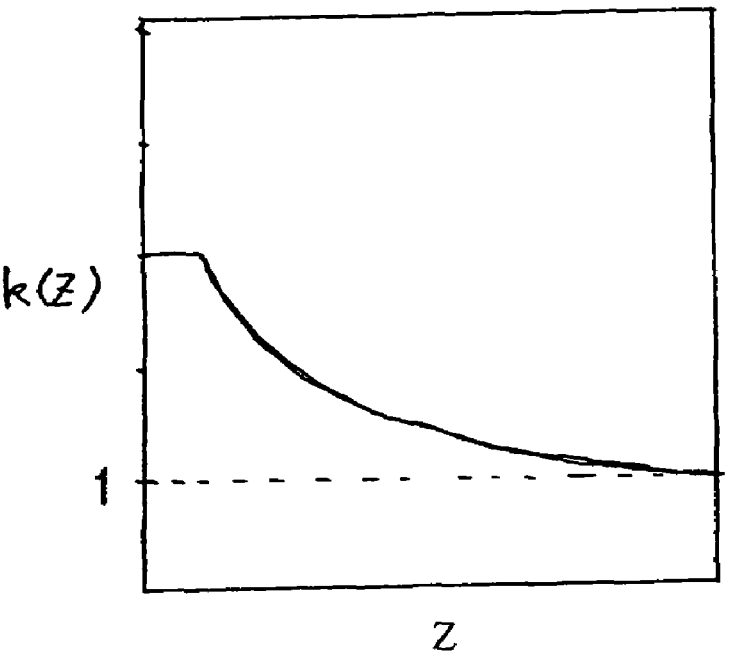

FIG. 4
[A]
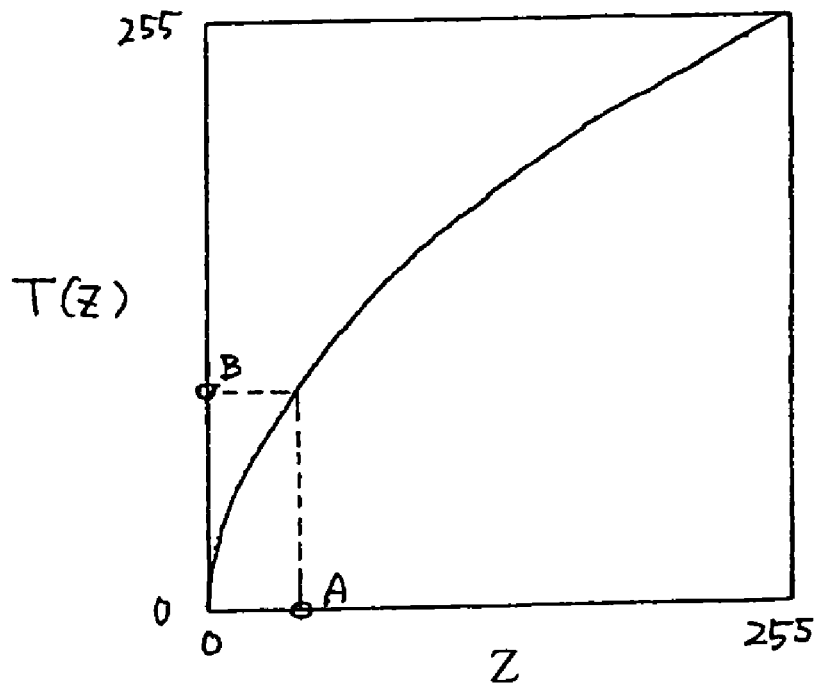
[B]
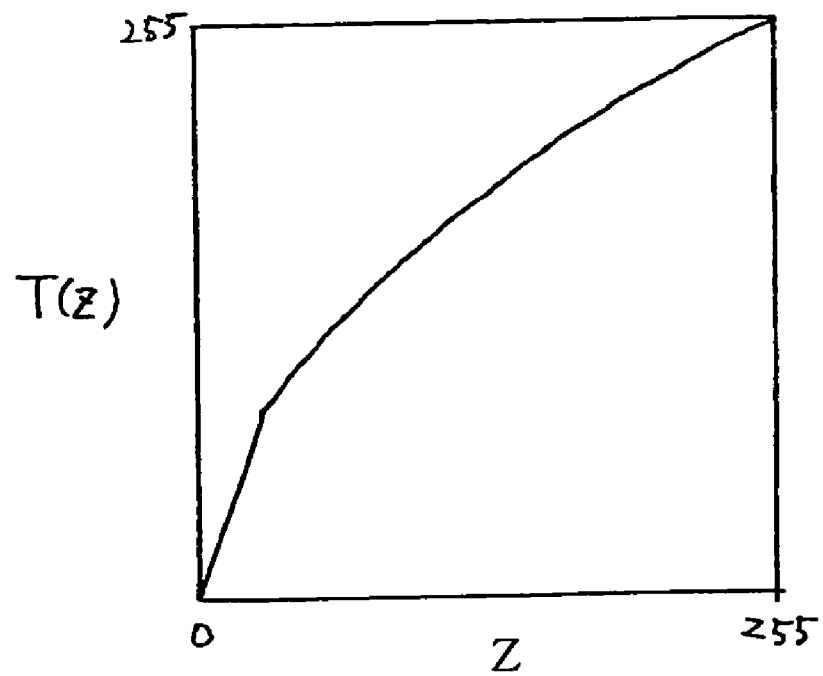

*FIG.5*

|  | Cr >= 0 | Cr < 0 |
|---|---|---|
| Cb >= 0 | [R, B >= G]<br><br>Z IS DEFINED BY<br>Z = (3·R + 3·B − 2·G)/4,<br>MAINLY BASED ON R AND B | [B >= G > R]<br><br>Z IS DEFINED BY<br>Z = (−3·R + 2·G + 5·B)/4,<br>MAINLY BASED ON B |
| Cb < 0 | [R >= G > B]<br><br>Z IS DEFINED BY<br>Z = (5·R + 2·G − 3·B)/4,<br>MAINLY BASED ON R | [G > R, B]<br><br>Z IS DEFINED BY<br>Z = (−R + 6·G − B)/4,<br>MAINLY BASED ON G. |

IMAGE PROCESSING APPARATUS FOR IMAGE TONE TRANSFORMATION BASED ON INPUT SIGNALS, IMAGE PROCESSING PROGRAM, ELECTRONIC CAMERA, AND IMAGE PROCESSING METHOD FOR THE SAME

CROSS REFERENCE TO RELATED APPLICATION

This application is based upon and claims the benefit of priority from Japanese Patent Application No. 2004-272184, filed on Sep. 17, 2004, and No. 2005-053635, filed on Feb. 28, 2005, the entire contents of which are incorporated herein by reference.

BACKGROUND OF THE INVENTION

1. Field of the Invention

The present invention relates to an image processing technique for tone transformation of an image.

2. Description of the Related Art

Conventionally, a technique of applying tone transformation such as gamma transformation to RGB components or luminance components of image data has been known.

For example, in Japanese Unexamined Patent Application Publication No. Hei 4-150171, the procedure for the tone transformation is described as follows. First, a luminance component Y(=0.3·R+0.59·G+0.11·B) is substituted in a predetermined gamma transformation characteristic f to find a luminance signal Y'=f(Y) after the transformation. A transformation gain K(Y)=f(Y)/Y at this time is found and each of RGB components is multiplied by the transformation gain.

$$R'=K(Y)\cdot R,\ G'=K(Y)\cdot G,\ B'=K(Y)\cdot B$$

Such processing can prevent a change in hue after the tone transformation since a RGB ratio after the tone transformation matches a RGB ratio before the transformation.

However, controlling the transformation gain K by the luminance component Y as described above inevitably causes a problem of color saturation.

For example, assuming a color gamut of $0 \leq R, G, B \leq 1$, Y falls in a range of $0 \leq Y \leq 1$. Here, in a part where red is strong in an image, for example, in a pixel of (R, G, B)=(0.8, 0.1, 0.1), the luminance component is Y=0.31. If the transformation gain K is determined based on this luminance component Y, there is a possibility that the maximum transformation gain K becomes 1/0.31=3.22 times.

Meanwhile, a gain allowance of a R component is only 1/0.8=1.25. Therefore, when the transformation gain K is determined based on the luminance component Y, the color saturation of the R component is liable to occur. This is also true to a B component. Generally, the color saturation is more liable to occur in a color component less contributing to the luminance component.

The specification of U.S. Pat. No. 6,677,959 discloses a method in which the maximum values of R, G, and B, that is, max (R, G, B) are found, and a correction coefficient is determined so that the maximum values do not exceed a dynamic range, and R, G, and B are multiplied by this correction coefficient, thereby finding R', G', and B' after the transformation. This method can prevent the color saturation of red and blue.

However, the U.S. Pat. No. 6,677,959 does not teach the optimum processing method in a luminance/color difference space (such as a YCrCb space), though teaching the tone transformation in a R, G, B color space.

SUMMARY OF THE INVENTION

Therefore, in view of the problems described above, an electronic camera of the present invention provides a technique of tone transformation without causing much adverse effect such as color saturation in a luminance/color difference space.

[1]

An image processing apparatus of the present invention receives a luminance signal, indicating luminance or an amount of brightness and an input signal indicating a plurality of color differences, the apparatus including: 1) a signal generator generating a signal Z depending on the input signal indicating the plural color differences; 2) a gain generator generating a transformation gain k(Z) by using the signal Z; and 3) a tone transformation unit which multiplies the luminance signal or a linear transformation signal of the luminance signal by the transformation gain k(Z) to calculate a luminance signal after tone transformation.

This invention makes it possible to calculate, from an image signal of a luminance/color difference system, the signal Z to comprehensively reflect depth and luminance of color with small processing cost. This signal Z can accurately indicate to what degree saturation is liable to occur at a local point in an image.

The use of this signal Z as a basis for the tone transformation makes it possible to reduce a saturation and the like after the tone transformation.

[2]

Preferably, the luminance signal is a luminance function, and the plural color differences are color differences Cr, Cb.

[3]

Preferably, the luminance signal is a function L of CIELab or a transformation of the function L, and the plural color differences are a and b respectively.

[4]

Preferably, the signal generator calculates the signal Z by an equation Z=V+w1·C1+w2·C2, changing values of w1 and w2 depending on values of C1 and C2, where C1 and C2 are input signal indicating the plural color differences and V is the luminance signal indicating the luminance or the amount of brightness.

[5]

Preferably, the signal generator calculates the signal Z by an equation Z=V+w3·|C1|+w4·|C2| (w3 and w4 are predetermined constants), where C1 and C2 are input signal indicating the plural color differences and V is the luminance signal indicating the luminance or the amount of brightness.

[6]

Preferably, the tone transformation unit uses the luminance signal after tone transformation by equations C1'=k(Z)·C1 and C2'=k(Z)·C2, or C1'=k1(Z)·C1 and C2'=k1(Z)·C2(k1(Z)), where C1 and C2 are input signals indicating the plural color differences, and C1' and C2' are color differences after the tone transformation, and k1(Z)=k(Z)·T(Z) or k1(Z)=k(T(Z)) where T(Z) is a function monotonically changing with respect to Z).

[7]

Another image processing apparatus of the present invention includes: 1) a signal generator calculating a signal Z from R, G, B input signals by an equation $Z=Y+w3\cdot|Cr|+w4\cdot|Cb|$ (w3 and w4 are predetermined constants), where $Y=a1\cdot R+a2\cdot G+a3\cdot B$, $Cr=R-Y$, and $Cb=B-Y$, or by an equation $Z=Y+w1\cdot Cr+w2\cdot Cb$, where values of w1 and w2 are changed depending on a magnitude relation of Cr and Cb; 2) a gain generator generating a transformation gain k(Z) as a function of Z by using the signal Z; and 3) a tone transformation unit which uses the transformation gain k(Z) to calculate R', G', B' signals after transformation by equations $R'=k(Z)\cdot R$, $G'=k(Z)\cdot G$, and $B'=k(Z)\cdot B$.

[8]

An image processing program of the present invention causes a computer to function as the aforesaid signal generator, gain generator, and tone transformation unit.

[9]

An electronic camera of the present invention includes: the aforesaid image processing apparatus; and an image-capturing unit capturing an image of a subject to generate an image signal. Further, this electronic camera executes tone transformation by inputting the image signal generated by the image-capturing unit to the image processing apparatus.

[10]

An image processing method of the present invention is to execute the following steps when receiving a luminance signal indicating luminance or an amount of brightness and an input signal indicating a plurality of color differences:
1) generating a signal Z depending on the input signal indicating the plural color differences;
2) generating a transformation gain k(Z) by using the signal Z; and
3) multiplying the luminance signal or a linear transformation signal of the luminance signal by the transformation gain k(Z) to calculate a luminance signal after tone transformation.

[11]

Another image processing method of the present invention is to execute the following steps:
1) calculating a signal Z from R, G, B input signals by an equation $Z=Y+w3\cdot|Cr|+w4\cdot|Cb|$ (w3 and w4 are predetermined constants), where $Y=a1\cdot R+a2\cdot G+a3\cdot B$, $Cr=R-Y$, and $Cb=B-Y$, or by an equation $Z=Y+w1\cdot Cr+w2\cdot Cb$, where values of w1 and w2 are changed depending on a magnitude relation of Cr and Cb;
2) generating a transformation gain k(Z) as a function of Z by using the signal Z; and
3) using the transformation gain k(Z) to calculate R', G', B' signals after transformation by equations $R'=k(Z)\cdot R$, $G'=k(Z)\cdot G$, and $B'=k(Z)\cdot B$.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3[A] and FIG. 3[B] are charts showing examples of a tone transformation gain k(Z);

FIG. 4[A] and FIG. 4[B] are charts showing examples of a gain T(Z) for saturation correction;

FIG. 5 is a table to explain the characteristics of the signal Z;

DETAILED DESCRIPTION OF THE PREFERRED EMBODIMENTS

Hereinafter, embodiments of the present invention will be described in detail based on the drawings.

First Embodiment

Figure 1:
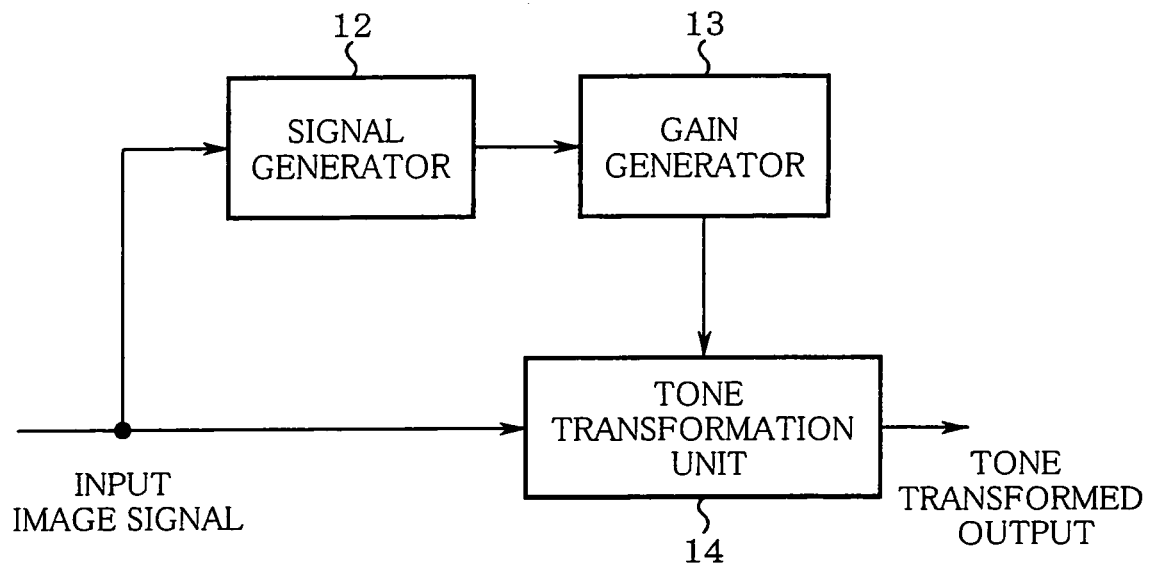
FIG. 1 is a block diagram showing an image processing apparatus 11.

FIG. 1 is a block diagram showing a configuration of an image processing apparatus 11.

In FIG. 1, an image signal to be processed is inputted to a signal generator 12 and a tone transformation unit 14. In the signal generator 12, a signal Z including color differences is generated for each pixel based on the inputted image signal. The generated signal Z is outputted to a gain generator 13. The gain generator 13 calculates, for each pixel, a transformation gain k(Z) by substituting this signal Z in a predetermined tone transformation curve k (such as a gamma curve, a high-contrast curve, a low-contrast curve, . . . ). The transformation gain k(Z) for each pixel is given to the tone transformation unit 14. The tone transformation unit 14 multiplies each component of the image signal, which is to be subjected to tone transformation, by the transformation gain k(Z) to complete the tone transformation.

Figure 2:
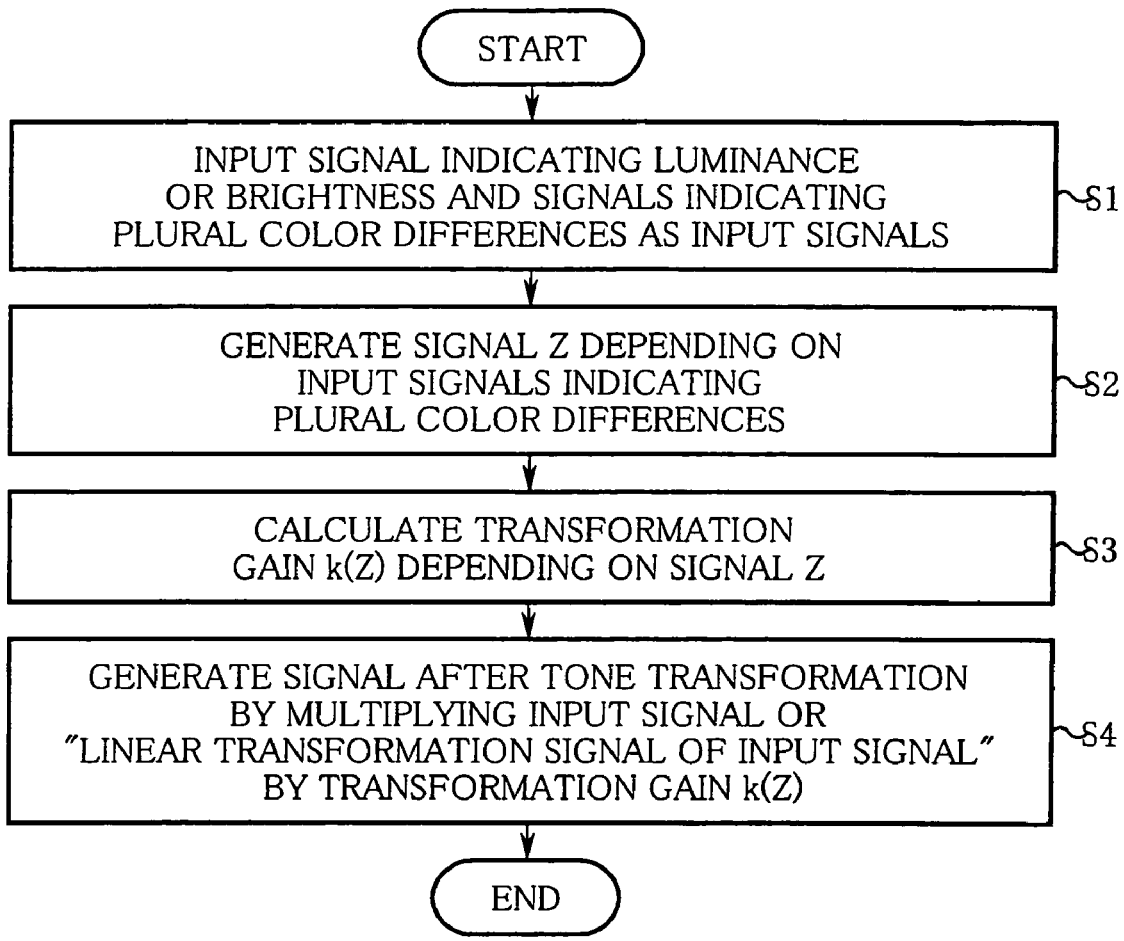
FIG. 2 is a flowchart showing an operation of calculating a signal Z and a tone transformation operation.

FIG. 2 is a flowchart showing an operation of calculating the signal Z and a tone transformation operation by the image processing apparatus 11. Hereinafter, the operations of the image processing apparatus 11 will be described.

First, luminance/color differences YCbCr are inputted as an input image. The luminance/color differences YCbCr have the following relation with RGB color components.

$$Y = 0.299 \cdot R + 0.5870 \cdot G + 0.1140 \cdot B$$

$$Cr = 0.5 \cdot B - 0.3316 \cdot G - 0.1684 \cdot R$$

$$Cb = 0.5 \cdot R - 0.4187 \cdot G - 0.0813 \cdot B$$

For calculating the signal Z based on which the transformation gain k(Z) is determined, condition values d1, d2, d3 as bases for determining the magnitude relation of RGB are found by using Y, Cb, and Cr values in the input (corresponding to S1 in FIG. 2).

$$R-G = d1 = 2.1159 \cdot Cr + 0.3441 \cdot Cb$$

$$R-B = d2 = 1.4032 \cdot Cr - 1.7718 \cdot Cb$$

$$G-B = d3 = -0.7127 \cdot Cr - 2.1159 \cdot Cb$$

Note that the condition values d1, d2, d3 are only for plus/minus judgment and therefore, one of the coefficients Cr and Cb is desirably defined as 1 in order to reduce the number of times of the multiplications, and for example, the following equations are preferable.

$$d1 = Cr + 0.1626 \cdot Cb$$

$$d2 = Cr - 1.2627 \cdot Cb$$

$$d3 = -Cr - 2.9688 \cdot Cb$$

Next, coefficients w1, w2 used for calculating the signal Z are determined based on the following condition judgment.

$$w1 = 0, w2 = 0,$$

if d1>=0 then begin if d2>=0 then w1=1.402 else w2=1.7718; end
   else begin if d3>=0 then begin w1=-0.7139; w2=0.3441; end
   else w2=1.7718; end;

Using the coefficients w1, w2, the signal Z is calculated as follows (corresponding to S2 in FIG. 2).

$$Z = Y + w1 \cdot Cr + w2 \cdot Cb$$

The signal Z thus calculated has a value substantially equivalent to max (R, G, B). This means that the signal Z has a value indicating "luminance" for a low-saturation pixel (R≈G≈B), while having a value reflecting "a value of a dominant color component", that is, "depth of color" for a high-saturation pixel.

Using this signal Z, the transformation gain k(Z) corresponding to an input/output ratio of a predetermined tone transformation characteristic (for example, a γ curve, an S curve, or the like) is found (corresponding to S3 in FIG. 2). FIG. 3[A] and FIG. 3[B] are charts showing examples of the transformation gain k(Z).

An image signal Y'Cb'Cr' after the tone transformation is calculated by Y'=k(Z)·Y, Cr'=k(Z)·Cr, and Cb'=k(Z)·Cb (corresponding to S4 in FIG. 2).

Through the above-described processing, in spite that this processing is the arithmetic processing in a luminance/color difference space, it is possible to find the signal Z reflecting both luminance and color depth. Determining the transformation gain k based on this signal Z results in a great reduction in color saturation compared with a case where Y is simply used.

Depending on an image, the saturation may be too high or too low after the tone transformation. For the transformation in this case, a transformation gain k1(Z), which is different from the transformation gain for the luminance, is preferably used for the color differences. For example, the following equations are used for the calculation.

$$Y' = k(Z) \cdot Y,$$

$$C1' = k1(Z) \cdot C1, \text{ and}$$

$$C2' = k1(Z) \cdot C2$$

Here, k1(Z) is preferably calculated by $$k1(Z) = k(Z) \cdot T(Z) \text{ or } k1(Z) = k(T(Z)).$$

Note that the function T(Z) in the above equations is a monotonically changing function that has been adjusted through subjective evaluation of image quality.

FIG. 4[A] and FIG. 4[B] are charts showing two examples of the function T(Z).

Note that this embodiment has described the case of YCrCb, but in a case of other luminance/color difference coordinate system, the same processing is possible if coefficients are appropriately determined. For example, in the calculation in a CIELab coordinate system, L, a, and b are usable in place of Y, Cr, and Cb respectively.

Second Embodiment

An image processing apparatus of a second embodiment has the same configuration as that of the first embodiment (FIG. 1), and therefore, description thereof will be omitted here.

This embodiment will describe a case where an input image is YCbCr and the first embodiment is further simplified.

Here, a signal Z is defined as follows.

$$Z = Y + w3 \cdot |Cr| + w4 \cdot |Cb|$$

The coefficients w3, w4 in the equation are coefficients indicating how much influence saturation (depth of color) gives to a saturation phenomenon at the time of tone transformation, and can be experimentally or theoretically determined based on the tone transformation of test images.

The meaning of the signal Z will be shown below in FIG. 5. Here, a case where Y=(R+2·G+B)/4 and Z=Y+(|Cr|+|Cb|)/2 is shown.

Thus, the signal Z has a value reflecting the largest value of RGB. Specifically, the signal Z has a value indicating "luminance" for a low-saturation pixel (R≈G≈B), while for a high-saturation pixel, having a value reflecting "a value of a dominant color component", that is, "depth of color".

The tone transformation is the same as that of the first embodiment, and therefore, description thereof will be omitted.

Through the above processing, in spite that this processing is the arithmetic processing in a luminance/color difference space, it is possible to find the signal Z reflecting both luminance and depth of color. Determining the transformation gain k based on this signal Z results in a great reduction in color saturation compared with a case where Y is simply used.

Note that this embodiment has described the case of Y, Cr, and Cb, but in a case of other luminance/color difference coordinate system, the same processing is possible if the coefficients w3, w4 are set according to this luminance/color difference coordinate system. For example, in the calculation in a CIELab coordinate system, L, a, and b are usable in place of Y, Cr, and Cb respectively.

In addition, in a CIECAM02 coordinate system, lightness J is usable in place of Y, and chroma ac, bc are usable in place of Cr, Cb. In another expression of the same coordinate system, brightness Q is usable in place of Y, and colorfulness $a_M$, $b_M$ are useable in place of Cr, Cb. Also, in IPT color coordinate system, I is usable in place of Y, and P, T are usable in replace of Cr, Cb.

Here, signals Cr, Cb indicating a plurality of color differences can be approximated by using a value C defined in the following equation:

$$C = \sqrt{Cr^2 + Cb^2}$$

In this case the above-mentioned Z is approximated by the following equation:

$$Z = Y + w3 \cdot |Cr| + w4 \cdot |Cb|$$
$$\approx Y + w \cdot C$$

[Relation of Color Cube and Signal Z]

Here, the general relation of the signal Z and the RGB color cube will be described.

Figure 6:
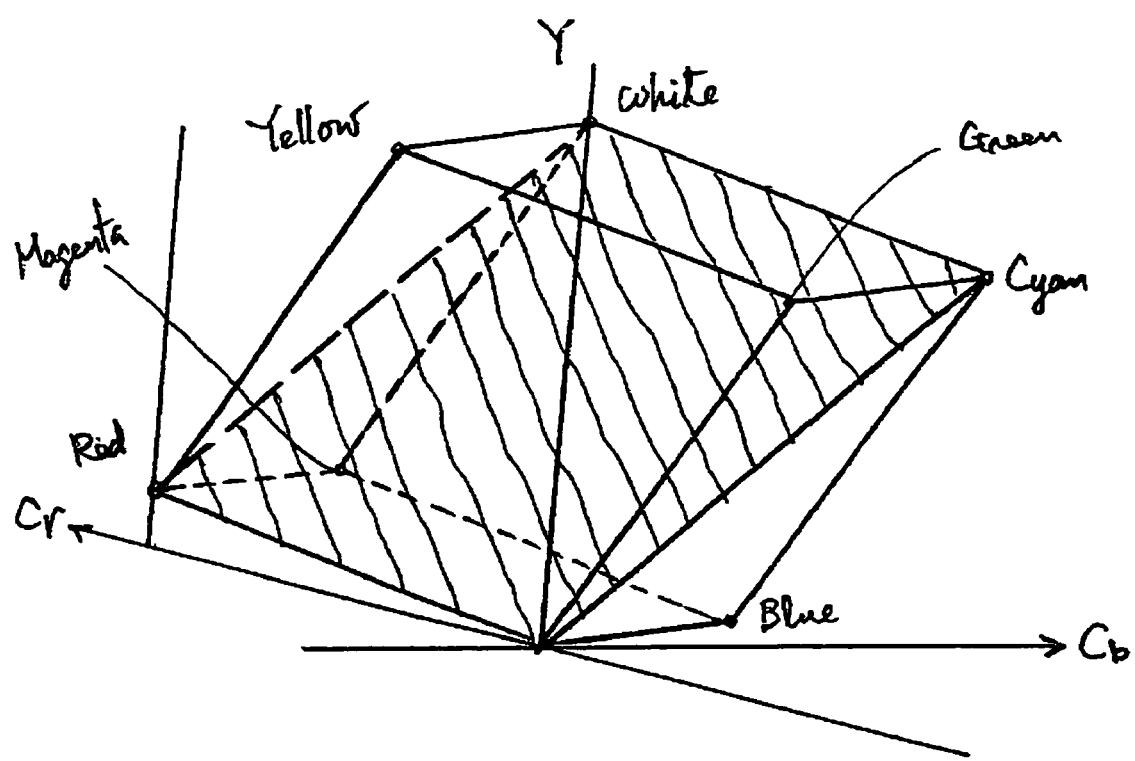
FIG. 6 is a chart showing a RGB color cube.

FIG. 6 is a perspective view of the RGB color cube.

Figure 7:
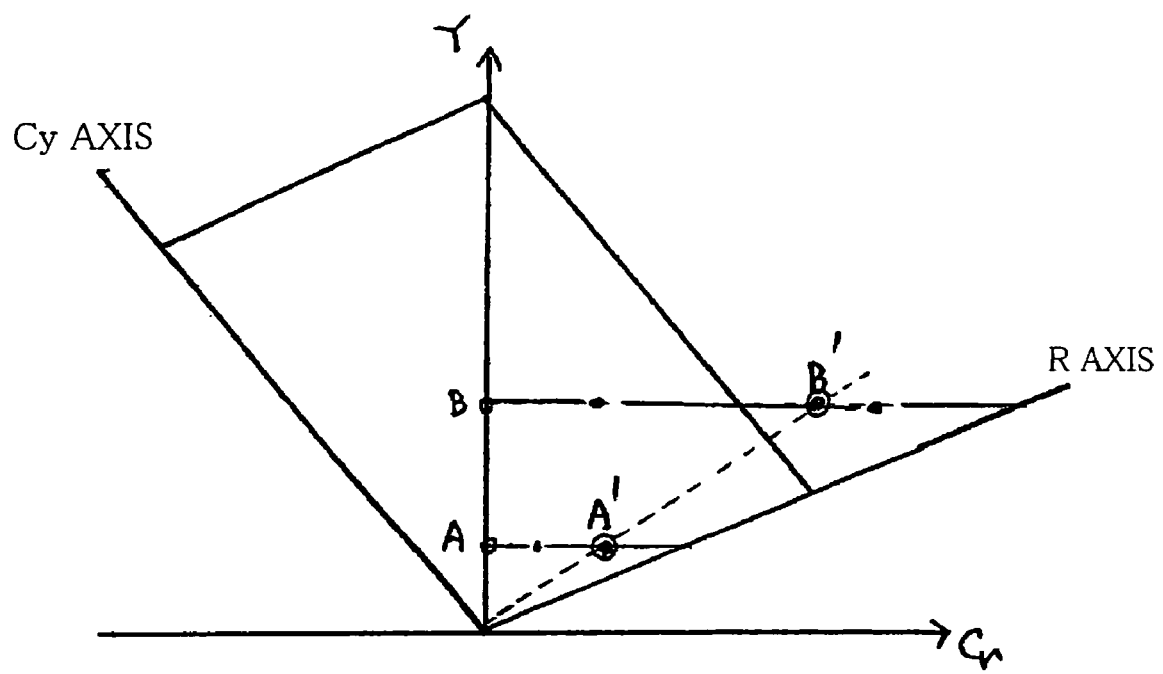
FIG. 7 is a chart showing tone transformation using a luminance signal Y.
Figure 8:
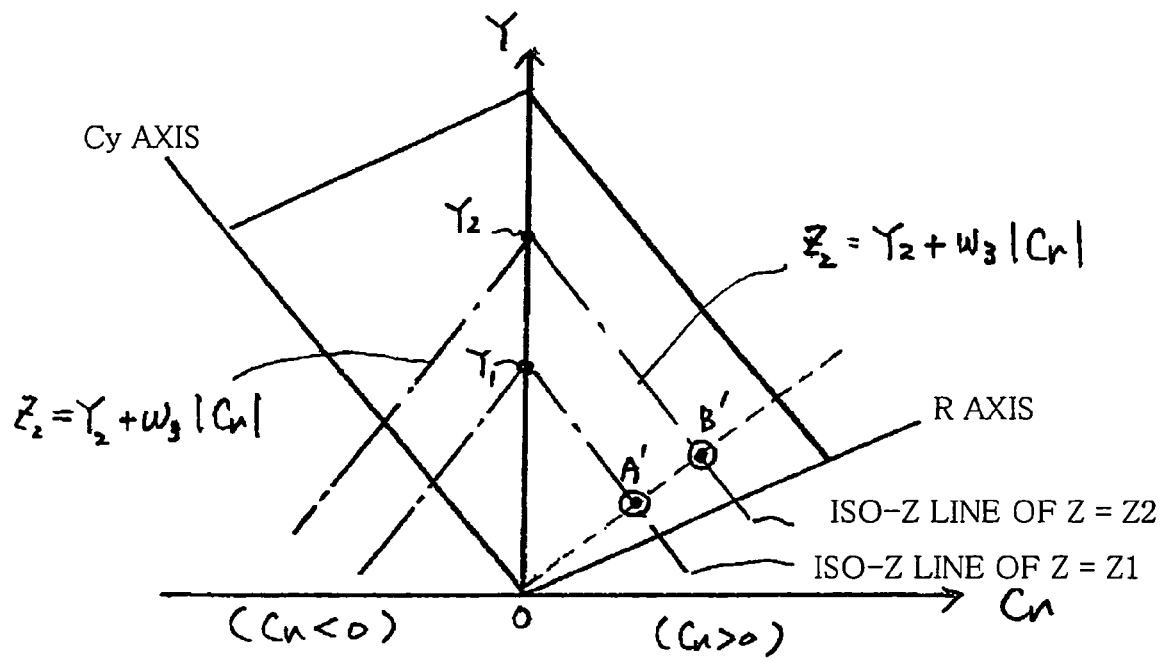
FIG. 8 is a chart to explain the characteristics of the signal $Z=Y+w3\cdot|Cr|$ in a cross section of Cb=0.
Figure 9:
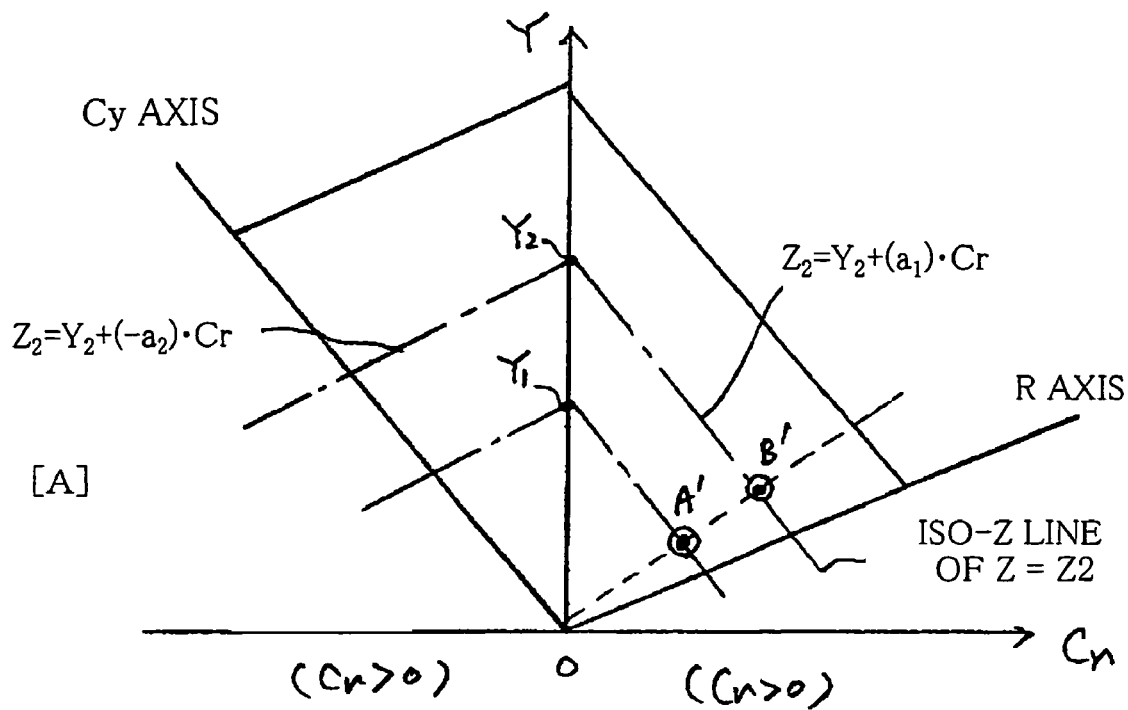
FIG. 9[A] and FIG. 9[B] are charts to explain the characteristics of the signal Z when coefficients a1, −a2 are selectively used according to plus/minus judgment of Cr and Cb.

In FIG. 7 to FIG. 9[A], a cross section of Cb=0 of the RGB color cube will be shown in order to simplify the description.

In FIG. 7, on a basis of a luminance signal Y, the tone transformation of luminance Y from A point to B point is performed. In this case, A' point with high saturation close to the R axis is transformed to B' point outside the RGB cube, so that color saturation occurs.

In FIG. 8, on the other hand, the signal Z expressed as Z=Y+w3·|Cr| is assumed in the cross section of Cb=0 by using the appropriate constant w3. The chain lines in FIG. 8 represent sets consisting of points where Z has constant values Z1 and Z2 (hereinafter, referred to as an "iso-Z line (plane)"). When the iso-Z plane corresponds to "an upper limit value Zmax of the signal Z" not falling outside the RGB color cube and a tone transformation gain G of the signal Z is determined in the range of the following expression $$G \leq Zmax/Z,$$

a given point in the RGB color cube does not fall outside the RGB color cube after the tone transformation.

Note that strictly speaking, an optimum value of w3 on a positive side of Cr is generally different from that on a negative side of Cr, but approximately representing them by one value w3 causes little practical problem.

Further, depending on how w3 is determined, such a case is assumable that some point falls outside the RGB color cube. However, color saturation is sufficiently small compared with that when the luminance signal Y is used for a basis of the tone transformation (see FIG. 7), and thus the effect of the present invention is not lost.

FIG. 9[A] is also a chart showing the cross section of Cb=0.

Further, FIG. 9[B] shows a case where coefficients a1, −a2 of the signal Z by which Cr is multiplied are changed according to plus/minus judgment of Cr. Thus changing the coefficients a1, −a2 makes it possible to make the iso-Z line (plane) in the vicinity of the upper limit value Zmax considerably approximate the shape of the border plane of the RGB color cube. The use of this signal Z as the basis makes it possible to prevent a given point in the RGB color cube from falling outside the RGB color cube after the tone transformation, thus enabling the expansion of a selection range of the tone transformation gain G to the limit.

Depending on how the coefficient values a1, −a2 shown in FIG. 9[A] and FIG. 9[B] are determined, some point falls outside the RGB color cube, but color saturation is sufficiently small compared with that when the luminance signal Y is used as a basis of the tone transformation (see FIG. 7), and thus the effect of the present invention is not lost.

Further, as shown in the condition table in FIG. 9[B], values of coefficients w1, w2 may also be changed according to the plus/minus conditions of Cr and Cb when Cb is not 0. Such change makes it possible to make the iso-Z plane considerably approximate the shape of the border plane of the RGB color cube.

Here, the parameters of the defining equation of the signal Z are determined so that the iso-Z plane has a plane substantially parallel to the border plane of the RGB color cube, but in actual practice, appropriate coefficients of the signal Z are preferably set based on the results of experiments using a large number of transformed images.

Next, another embodiment will be described.

Third Embodiment

A third embodiment is an embodiment of an electronic camera.

Figure 10:
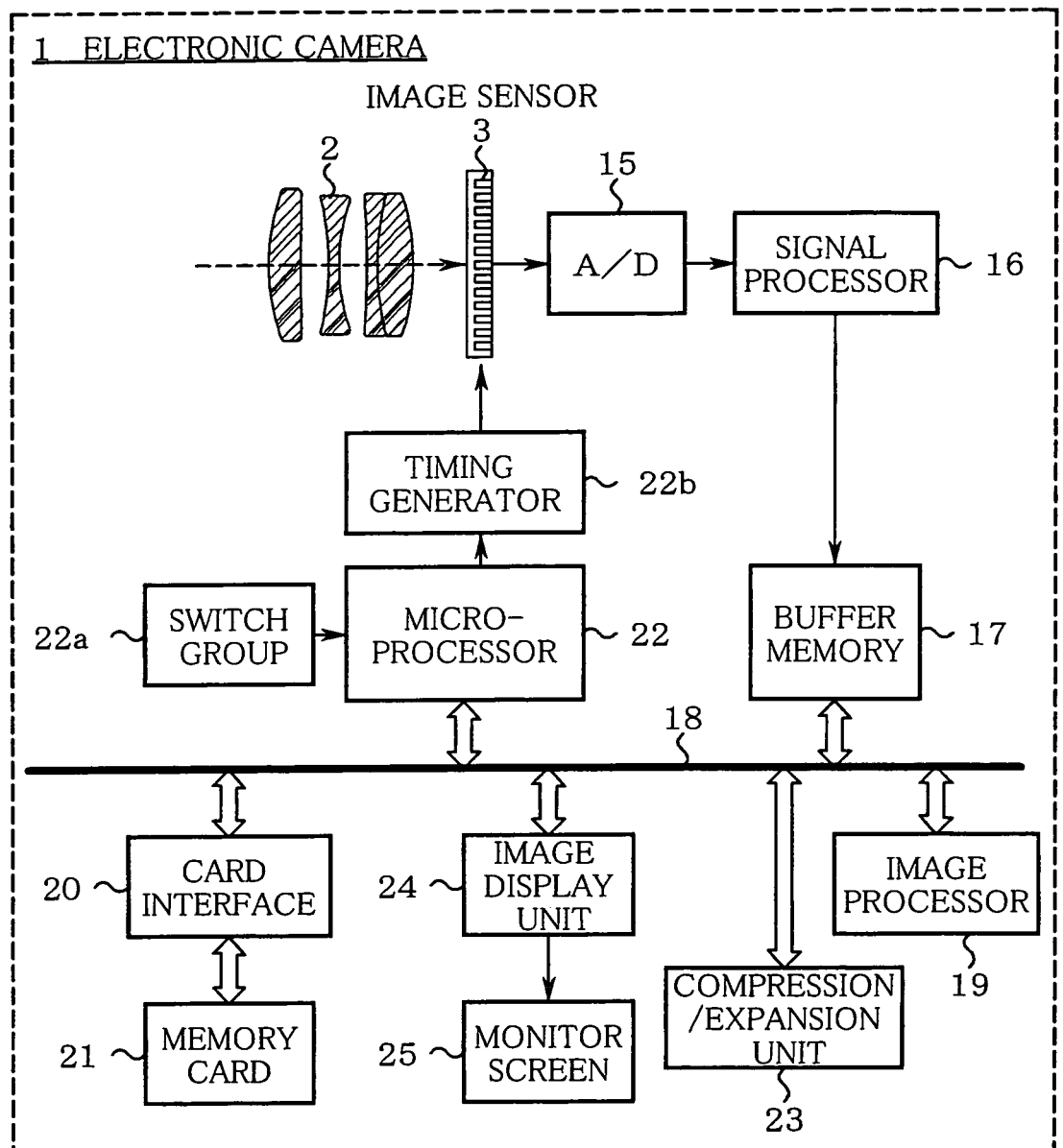
FIG. 10 is a diagram showing a configuration of an electronic camera.

FIG. 10 is a block diagram showing a configuration of this embodiment.

In FIG. 10, an image-capturing lens 2 is attached to an electronic camera 1. A light-receiving surface of an image sensor 3 is disposed in an image space of the image-capturing lens 2. Operations of the image sensor 3 are controlled by an output pulse of a timing generator 22*b*.

An image created by the image sensor 3 is temporarily stored in a buffer memory 17 via an A/D converter 15 and a signal processor 16.

The buffer memory 17 is connected to a bus 18. An image processor 19, a card interface 20, a microprocessor 22, a compression/expansion unit 23, and an image display unit 24 are connected to the bus 18. Among them, the card interface 20 reads/writes data from/to a removable memory card 21. Further, a signal is inputted to the microprocessor 22 from a switch group 22*a* of the electronic camera 1 by a user's operation. Further, the image display unit 24 displays an image on a monitor screen 25 provided on a rear side of the electronic camera 1.

The electronic camera 1 as configured above processes the tone transformation of the first and second embodiments in the microprocessor 22 and the image processor 19.

Such tone transformation may be processed for image data when it is captured or may be processed at a later time for the image data saved in the memory card 21.

Supplemental Items of Embodiments

Note that it is also possible to realize the tone transformation processing of the above-described embodiments on a computer. This can be realized by the use of an image processing program which causes the computer to function as the signal generator 12, the gain generator 13, and the tone transformation unit 14 in the first and second embodiments.

Further, in the above-described embodiments, the inputted image signal may be RAW data (color pattern data such as a Bayer pattern) and the RAW data may be subjected to the tone transformation. In this case, all color components are not obtained for each pixel, so that the signal Z cannot be directly generated for each pixel.

In this case, the RAW data is processed to generate signal components (RGB color components, or a color difference components/luminance signal, or the like) for each pixel by using color components of neighboring pixels, and the signal Z can be found based on the obtained signal components.

Further, the RAW data may be divided in a unit of a pixel block for which signal components necessary for generating the signal Z are all obtained, and from the signal Z obtained for each pixel block, the tone transformation gain k(Z) to be employed for the relevant pixel block may be determined.

Note that the color pattern data in the RAW data may be multiplied by the tone transformation gain k(Z). Further, the tone transformation gains k(Z) may be stored in image processing information in the RAW data for later reference in executing the tone transformation.

Further, the image processing methods of the above-described embodiments may be provided as a service to image data transmitted from a user, in an image processing server or an image album server on the Internet or the like. It is also possible that image data is obtained via a recording medium or a communication medium, and a print server providing a print service implements the image processing methods of the above-described embodiments as pre-print processing.

<<Application to Other Color Coordinate Systems>>

In the present application the signal components of a color image is generally expressed as a luminance signal and color differences. However, in actual color specification systems, various different color coordinate systems are used.

For example, the luminance signal is replaceable with an achromatic component (signal component assumed to be achromatic information). Also, the color differences are replaceable with a chromatic component (signal component assumed to be chromatic information). Accordingly, the replacement as shown in the following list is also possible.

| representation | | achromatic component | chromatic component |
|---|---|---|---|
| YCC | Y: Cr, Cb | luminance | chrominance |
|  |  | luma | chroma |
| Lab | L: a, b | lightness | chroma |
| CIECAM | J: $a_c$, $b_c$ | lightness | chroma |
|  | Q: $a_M$, $b_M$ | brightness | colorfulness |
| IPT | I: P, T | lightness | chroma |

The invention is not limited to the above embodiments and various modifications may be made without departing from the spirit and scope of the invention. Any improvement may be made in part or all of the components.

What is claimed is:

1. An image processing apparatus which receives a luminance signal indicating luminance or an amount of brightness and an input signal indicating a plurality of color differences, the apparatus comprising:
   a signal generator generating a signal Z depending on the luminance signal and the input signal indicating the plurality of color differences, in which the luminance signal and the input signal are of the same image signal;
   a gain generator generating a transformation gain k(Z) by using the signal Z; and
   a tone transformation unit which multiplies the luminance signal or a linear transformation signal of the luminance signal by the transformation gain k(Z) to calculate a luminance signal after tone transformation, wherein
   the signal generator calculates the signal Z by an equation $Z=V+w1 \cdot C1+w2 \cdot C2$, changing values of w1 and w2 depending on values of C1 and C2, where C1 and C2 are input signals indicating the plurality of color differences and V is the luminance signal indicating the luminance or the amount of brightness.

2. The image processing apparatus according to claim 1, wherein
   the luminance signal is a luminance function, and the plurality of color differences are color differences Cr, Cb.

3. The image processing apparatus according to claim 1, wherein
   the luminance signal is a function L of CIELab or a transformation of the function L, and the plurality of color differences are a and b, respectively.

4. The image processing apparatus according to claim 1, wherein
   the signal generator calculates the signal Z by an equation $Z=V+w3 \cdot |C1|+w4 \cdot |C2|$, where w3 and w4 are predetermined constants, and C1 and C2 are input signals indicating the plurality of color differences and V is the luminance signal indicating the luminance or the amount of brightness.

5. The image processing apparatus according to claim 1, wherein
   the tone transformation unit calculates the luminance signal after tone transformation by equations $C1'=k(Z) \cdot C1$, $C2'=k(Z) \cdot C2$, or $C1'=k1(Z) \cdot C1$, $C2'=k1(Z) \cdot C2(k1(Z))$, where C1 and C2 are input signals indicating the plurality of color differences, and C1' and C2' are color differences after the tone transformation, and $k1(Z)=k(Z) \cdot T(Z)$ or $k1(Z)=k(T(Z))$ where T(Z) is a function monotonically changing with respect to Z.

6. The image processing apparatus according to claim 1, wherein
   the signal generator calculates the signal Z from R, G, B input signals by an equation $Z=Y+w3 \cdot |Cr|+w4 \cdot |Cb|$, where $Y=a1 \cdot R+a2 \cdot G+a3 \cdot B$, $Cr=R-Y$, and $Cb=B-Y$, and w3 and w4 are predetermined constants, or by an equation $Z=Y+w1 \cdot Cr+w2 \cdot Cb$, where values of w1 and w2 are changed depending on a magnitude relation of Cr and Cb;
   the gain generator generates the transformation gain k(Z) as a function of Z by using the signal Z; and
   the tone transformation unit uses the transformation gain k(Z) to calculate R', G', B' signals after transformation by equations $R'=k(Z) \cdot R$, $G'=k(Z) \cdot G$, and $B'=k(Z) \cdot B$.

7. An electronic camera comprising:
   the image processing apparatus according to claim 1; and
   an image-capturing unit capturing an image of a subject to generate an image signal, wherein
   the image signal generated by the image-capturing unit is input to the image processing apparatus to execute tone transformation.

8. An image processing method comprising the steps of:
   when receiving a luminance signal indicating luminance or an amount of brightness and an input signal indicating a plurality of color differences,
   generating a signal Z depending on the luminance signal and the input signal indicating the plurality of color differences, in which the luminance signal and the input signal are of the same image signal;
   generating a transformation gain k(Z) by using the signal Z; and
   multiplying the luminance signal or a linear transformation signal of the luminance signal by the transformation gain k(Z) to calculate a luminance signal after tone transformation, wherein the signal Z is calculated by an equation $Z=V+w1 \cdot C1+w2 \cdot C2$, changing values of w1 and w2 depending on values of C1 and C2, where C1 and C2 are input signals indicating the plurality of color differences and V is the luminance signal indicating the luminance or the amount of brightness.

9. An image processing method according to claim 8, further comprising the steps of:

calculating the signal Z from R, G, B input signals by an equation $Z=Y+w3 \cdot |Cr|+w4 \cdot |Cb|$, where $Y=a1 \cdot R+a2 \cdot G+a3 \cdot B$, $Cr=R-Y$, and $Cb=B-Y$, and w3 and w4 are predetermined constants, or by an equation $Z=Y+w1 \cdot Cr+w2 \cdot Cb$, where values of w1 and w2 are changed depending on a magnitude relation of Cr and Cb;

generating the transformation gain k(Z) as a function of Z by using the signal Z; and using the transformation gain k(Z) to calculate R', G', B' signals after transformation by equations $R'=k(Z) \cdot R$, $G'=k(Z) \cdot G$, and $B'=k(Z) \cdot B$.

* * * * *